United States Patent [19]

Johanning

[11] Patent Number: 4,607,957
[45] Date of Patent: Aug. 26, 1986

[54] PLANT FOR THE CONTINUOUS PREPARATION OF FLOATED FODDER

[75] Inventor: Hermann Johanning, Melle, Fed. Rep. of Germany

[73] Assignee: Engelbrecht & Lemmerbrock GmbH & Co., Melle, Fed. Rep. of Germany

[21] Appl. No.: 506,118

[22] Filed: Jun. 20, 1983

[30] Foreign Application Priority Data

Jun. 22, 1982 [DE] Fed. Rep. of Germany ....... 3223198

[51] Int. Cl.$^4$ ............................................. B01F 15/04
[52] U.S. Cl. ..................... 366/156; 366/158; 366/162; 366/179; 366/182; 366/603; 119/51.5; 222/413; 222/464
[58] Field of Search ............................ 119/51.5, 56 R; 222/256, 389, 412, 413, 464; 366/14, 15, 33, 34, 35, 40, 142, 151, 152, 153, 154, 155, 156, 157, 158, 160, 162, 168, 177, 179, 181, 182, 603

[56] References Cited

U.S. PATENT DOCUMENTS

| | | | |
|---|---|---|---|
| 2,917,465 | 12/1959 | Begley | 366/155 |
| 3,490,655 | 1/1970 | Ledgett | 222/464 |
| 4,148,100 | 4/1979 | Moller | 366/181 |
| 4,312,265 | 1/1982 | Enterline | 366/158 |
| 4,334,784 | 6/1982 | Engels | 366/158 |

FOREIGN PATENT DOCUMENTS

S135145 11/1949 Australia .......................... 366/156

Primary Examiner—Robert W. Jenkins
Assistant Examiner—Arthur D. Dahlberg
Attorney, Agent, or Firm—Balogh, Osann, Kramer, Dvorak, Genova & Traub

[57] ABSTRACT

This invention relates to a plant for the preparation of floated fodder, i.e. fodder in aqueous suspension made from humid grit or granulate and water with supplementary nutritional components and is based on a gastight high-rise silo comprising a central gravity shaft to which the grit is fed and from which the grit is extracted at the bottom via a conveyor facility. In accordance with the invention, a metering worm or screw opening onto a mixer is joined in gastight manner to the outlet of the bottom silo extractor, a second open mixer receiving supplementary nutritional components from containers which are not necessarily gastight, via individual metering worms or screws being situated in the water supply pipe or in the delivery pipe of the mixer. These components are supplied to the gastight mixer so that the correct ratio required between humid grit coming from the silo and the supplementary nutritional components is finally established in the gastight mixer in continuous manner with a controlled supply of water, and provided at the feeding points.

9 Claims, 1 Drawing Figure

U.S. Patent   Aug. 26, 1986   4,607,957
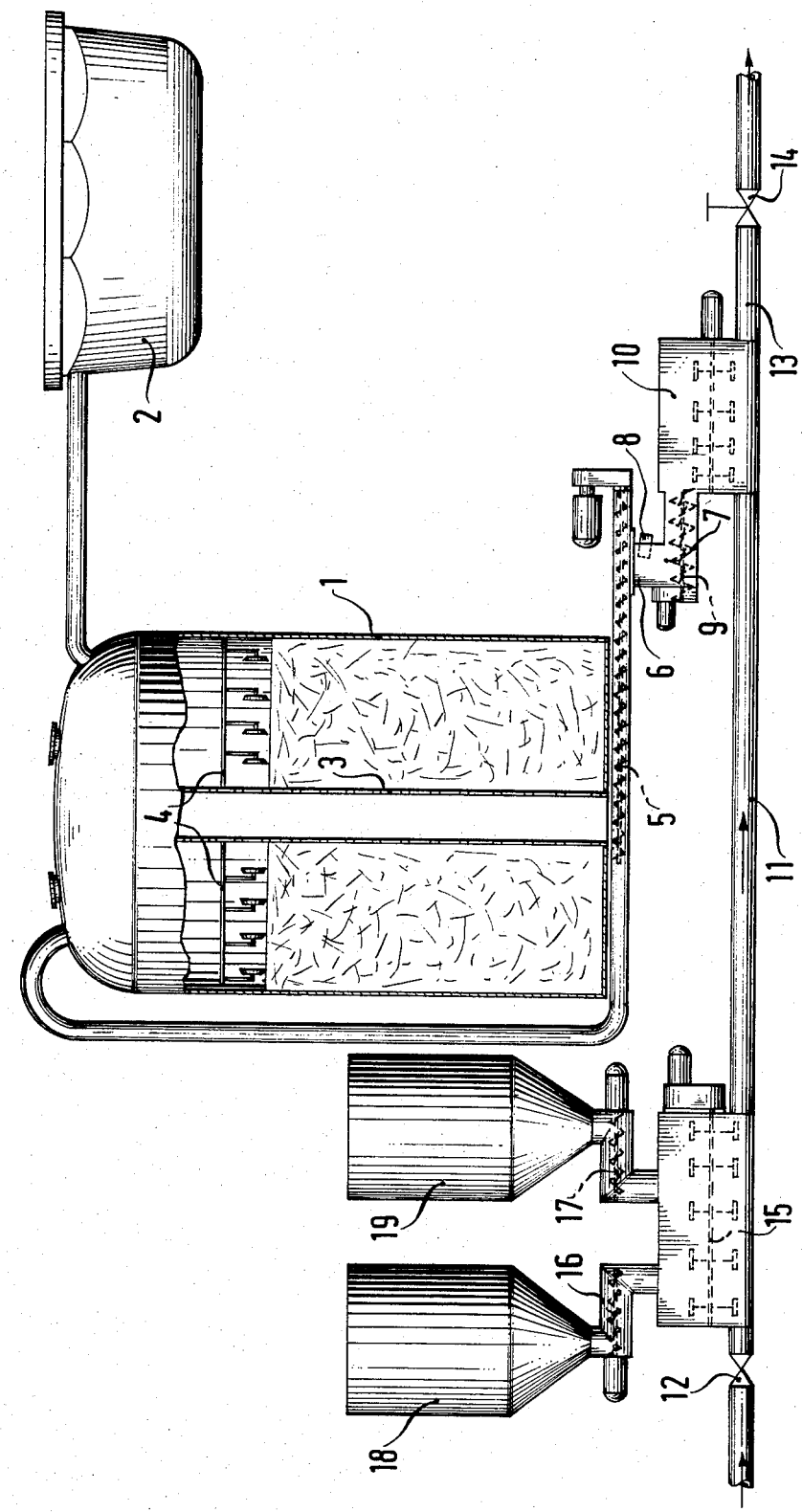

PLANT FOR THE CONTINUOUS PREPARATION OF FLOATED FODDER

BACKGROUND OF THE INVENTION

The present invention relates to a plant for the continuous preparation of floated fodder.

Floated fodders which are fed to the feeding points in a sty, stable or the like, via pipe lines, are produced to an increasing degree in animal husbandry for feeding livestock and in particular pigs.

The procedure followed until now consisted in withdrawing CCM (corn-cob mix) from the bottom of a high-rise silo, during which time it is possible to maintain a protective gas atmosphere in the upper enclosed silo volume. The CCM extracted is then ground fine with water in a crushing mill and placed in suspension in a tank at the required ratio between CCM and water.

It is also known that harvested CCM may be ground immediately and the CCM grit or granulate may be conveyed into a gastight high-rise silo comprising a central gravity shaft to which the granulate is fed by known conveyor elements operating radially inwards from the outside, and from which the granulate is extracted at the bottom end of the gravity shaft by means of a transverse conveyor sealed off in gastight manner, and then conveyed mechanically to a weighing container.

The invention is based on the latter gastight high-rise silos including a charge of ground CCM or ground damp cereal, and has for an object the production of a floated fodder continuously from damp granulate and supplementary fodder components from the granulate which is to be extracted from the silo, whilst maintaining a protective gas atmosphere in the silo.

SUMMARY OF THE INVENTION

Under application of a plant for the continuous production of floated fodder, i.e. fodder in aqueous suspension matter from humid grit (CCM, damp cereal) and supplementary fodder components, using a gastight high-rise silo containing the humid grit and comprising a central gravity shaft having perforations to which the humid grit is fed from the momentary top layer and whereof the bottom extremity has connected to it a transverse conveyor, the solution to the problem posed consists in that the outlet of the transverse conveyor has coupled to it in gastight manner a mixing tank incorporating an agitator mechanism via a metering device such as a metering worm or screw, which tank is connected to a water supply pipe and a discharge pipe leading to the feeding points, and in that a second mixer which is not gastight is situated in the supply or discharge pipe which receives supplementary nutritional components via individual metering devices, from storage vessels which need not necessarily be gastight.

The humid grit and the supplementary nutritional components, as well as the water supplied, are metered in the correct required ratio with respect to each other due to this solution, thereby allowing a continuous production of fodder in aqueous suspension which is thereupon conveyed to the feeding points in the stable, sty or the like via pipe ducts.

In order that the commonly required ratio of 80% humid grit and 20% of supplementary nutritional components may be maintained in any event even under excessive extraction of grit from the silo, provision is made in accordance with another embodiment that a charge level gauge arranged for activation and deactivation of the transverse conveyor drive, be installed before the metering screw leading to the gastight mixer and within the gastight connector to the outlet of the transverse conveyor, the connector acting as a buffer volume, so that grit is always available in the buffer volume for metered delivery to the gastight mixer, whilst preventing the buffer volume from being overloaded however, with the consequential disadvantages deriving therefrom.

BRIEF DESCRIPTION OF THE DRAWINGS

In order that the invention may be more clearly understood, reference will now be made to the accompanying drawing which shows one embodiment of the plant, illustrated diagrammatically, by way of example only.

DETAILED DESCRIPTION OF THE PREFERRED EMBODIMENT

Referring now to the drawing in accordance with the invention, use is made of a gastight high-rise silo 1 comprising a respirator bag 2 arranged to maintain a protective gas atmosphere within the silo which latter is provided with a central gravity shaft 3, e.g. comprising perforations, and which has fed to it by means of known conveyor elements 4, CCM grit or ground humid cereal loaded into the silo, from the momentary top layer, and the bottom end of which has connected to it a transverse conveyor 5, e.g. a conveyor worm or screw, having an outlet 6.

In accordance with the invention, the outlet 6 has joined to it in gastight manner a buffer volume 7 containing a charge level indicator gauge 8 used in known fashion to turn off the transverse conveyor 5 in case of excessive delivery volume of grit into the buffer volume 7, and to turn it on again after reduction of the level in the buffer volume. The grit is extracted from the buffer volume 7 by means of a metering worm or screw 9 and fed to a gastight mixer 10 comprising a stirring mechanism. A gastight closure of the high-rise silo is secured by this arrangement for the purpose of maintaining the protective gas atmosphere.

The mixer 10 has leading into it, i.e. is connected to, a water supply pipe 11 comprising a control valve 12, whereby the mixer 10 is supplied in controlled manner with as much water as needed to produce a fodder in aqueous suspension having the required ratio between grit and water. From the mixer 10, the floated fodder is fed to the feeding points in a stable, sty or the like, via a conveying pipe 13 that includes a shut-off valve 14.

A mixer 15 for supplementary nutritional components is installed either in the supply pipe 11 or else in the discharge pipe 13. This mixer 15 is supplied with supplementary fodder components, e.g. dry cereal grit or other additives containing trace elements, from tanks 18 and 19 which are not necessarily gastight, by means of individual metering worms or screws 16 and 17, in such manner that a floated fodder containing approximately 80% of grit or granulate drawn from the silo and 20% of supplementary fodder components drawn from the containers 18,19 is finally extracted from the gastight mixer 10.

The mixer 15 and the containers 18,19 may be open, since the sealing of the high-rise silo 1 is established by the gastight mixer 10 of the intake and delivery pipes 11,13 which are constantly filled with liquid.

The drives of the individual metering worms or screws 16 and 17 may be governed in respect of output or speed, and supply the mixer 15 with a constant volume per unit of time, and this volume is matched to the quantity of grit or granulate fed to the mixer 10 by the metering worm or screw 9 from the silo, whereas the quantity of water required for the continuous preparation of fodder in aqueous suspension is determined by means of the regulator valve 12.

I claim:

1. In a plant for the continuous production of fodder in aqueous suspension from humid grit and supplementary fodder components, using a gastight high-rise silo containing the humid grit and comprising a central gravity shaft having perforations to which the humid grit is fed from the top layer thereof, conveyor means for feeding the humid grit to said perforations, a transverse conveyor connected to the bottom end of said central gravity shaft for conveying outwardly the humid grit falling down to the bottom of said shaft, and a discharge pipe connected to said transverse conveyor and leading to feeding points, the improvement comprising a first metering device situated adjacent to the outlet of said transverse conveyor, a first gastight mixer, incorporating an agitating mechanism connected to said discharge pipe and coupled in gastight manner to the outlet of said transverse conveyor via said first metering device, a water supply pipe, provided with a regulator valve, connected to said first gastight mixer for supplying water thereto in controlled manner, a second mixer which is not gastight is installed in said water supply pipe for supplying supplementary fodder and nutritional components to said first gastight mixer, storage vessels for containing supplementary fodder and nutritional components to be received by the second mixer, and individual metering devices provided one for each of said storage vessels so that the second mixer receives the supplementary fodder and nutritional components from said storage vessels via the individual metering devices.

2. An improved plant according to claim 1, wherein said individual metering devices are adjustable as regards output or speed.

3. An improved plant according to claim 1, wherein said first metering device is a metering worm.

4. An improved plant according to claim 1, wherein said storage vessels are not gastight.

5. An improved plant according to claim 1, wherein said individual metering devices are metering worms.

6. An improved plant according to claim 1, wherein the second mixer is installed in the discharge pipe.

7. An improved plant according to claim 1, wherein a connector member acting as a buffer volume is joined in gastight manner to the outlet of said transverse conveyor, and a charge level gauge for turning on and off said transverse conveyor, is installed in said connector member, before said first metering device leading to said first gastight mixer.

8. An improved plant according to claim 1, wherein said metering device is a metering screw.

9. An improved plant according to claim 1, wherein said individual metering devices are metering screws.

* * * * *